Figure 1:
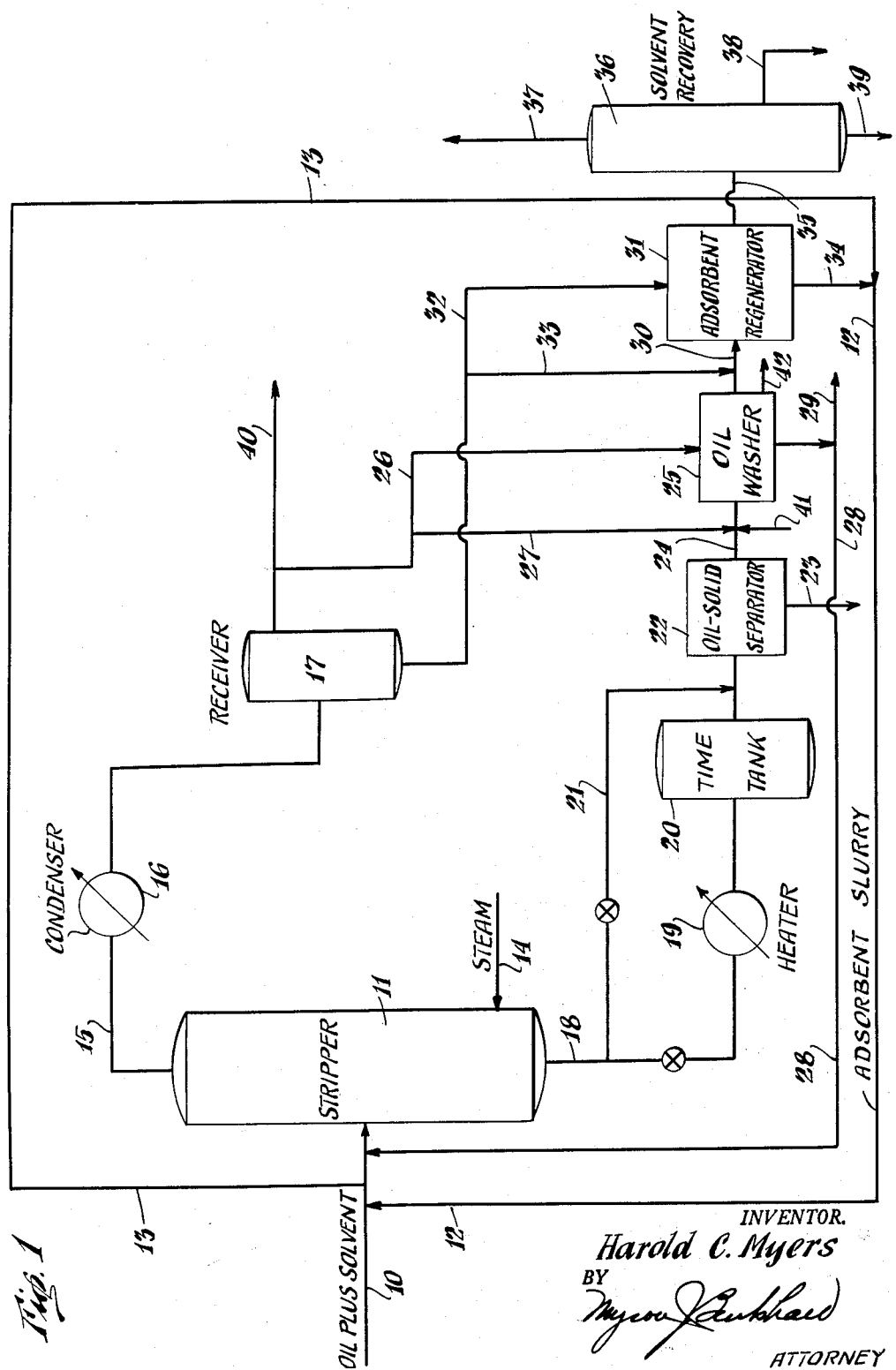

May 29, 1956  H. C. MYERS  2,748,064
METHOD OF DECOLORIZING OIL
Filed June 6, 1952  2 Sheets-Sheet 1

INVENTOR.
Harold C. Myers
BY
ATTORNEY

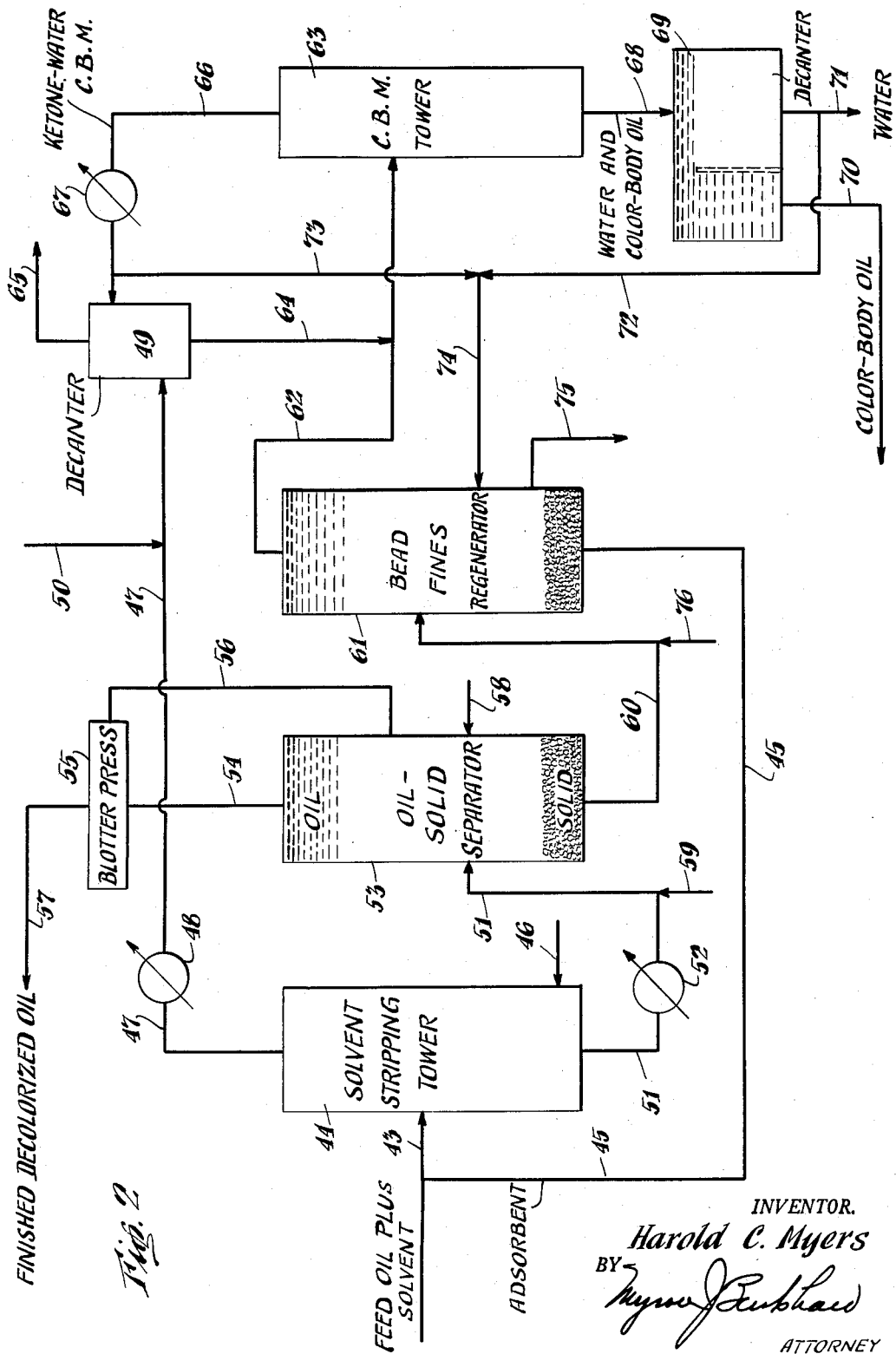

United States Patent Office 2,748,064
Patented May 29, 1956

2,748,064

METHOD OF DECOLORIZING OIL

Harold C. Myers, Woodbury, N. J., assignor to Socony Mobil Oil Company, Inc., a corporation of New York Application June 6, 1952, Serial No. 292,017

2 Claims. (Cl. 196—147)

This invention has to do with the decolorization of lubricating oil stocks by the use of relatively finely divided solid adsorbent materials.

Decolorization of lubricating oils by solid adsorbent materials may be carried out in several ways.

The oldest method is that of percolation of the oil through a fixed bed of granular adsorbent, strictly a batchwise process, in which, after the adsorbent becomes spent, the oil is diverted to flow through another filter bed, and the first filter bed is discharged from the filter and the adsorbent is revivified by burning.

A second method, now in use for several decades is known as "contact filtration." In this, the adsorbent, in finely divided form, usually with some moisture present, is admixed with the oil and the mixture is heated to temperatures of the order of 300–500° F., after which the adsorbent is physically separated from the oil. In general, attempts to revivify the finely divided spent adsorbent from this process have not been economical, and it is usually discarded without reuse.

Another method, known generally as the "Filtrol Fractionation" method, charges the adsorbent, finely divided, in admixture with an oil to be distilled into lube oil fractions, through the heater and into the fractionator of the lube oil fractionation system. The oil is separated into several fractions in the fractionator, the adsorbent going out with the bottoms fraction. Adsorbent is physically separated from this bottoms fraction. Here, again, the finely divided adsorbent is usually discarded without reuse.

In a newer method, oil to be treated passes upwardly through a downwardly descending compact bed of granular adsorbent. The adsorbent is removed from the bottom of the bed, washed free of entrained oil, regenerated by burning, and returned to the bed.

Most of these processes leave something to be desired. In those utilizing finely divided adsorbent, the adsorbent is usually discarded without reuse. In others, the performance, from the standpoint of oil yield and quality, may not be all that is necessary and supplemental processes must be used. In others, the capital investment in the plant and maintenance thereof sometimes may render the process applicable only to special circumstances.

This invention has for its principal object the provision of a process for the decolorization of oils with finely divided adsorbents which is capable of handling and regenerating the adsorbent in equipment of relatively simple nature, of relatively low cost, and capable of being tied in with already existing lube oil processing steps to give an overall process of attractive capability from the standpoint of oil product quality and of promising economic status.

It has for another object the provision of a process wherein relatively simple oil treating, adsorbent separation from oil, and adsorbent regeneration are combined in a manner not heretofore contemplated.

It has for a major object the provision of an oil decolorization operation capable of being tied in with an already existing type of lube oil processing and therefor capable of considerable operating economy.

These objects and others, either mentioned hereinafter, or readily apparent when the process is considered, flow from the conception that in solvent dewaxing and other solvent refining operations, particularly solvent dewaxing operations, wherein polar solvents are frequently used, the still in which solvents are stripped from the dewaxed or refined oil usually is operated at temperature levels conducive to decolorization of oil by finely divided adsorbents, and that the solvents used in such processes, when separated from oil, are useful for one or more of the steps necessary to free the spent adsorbent of entrained oil and to regenerate it for reuse.

In general, when applied in connection with a solvent refining process, such as, for example a dewaxing process using a mixture of benzol or toluol and methyl ethyl ketone or similar ketone as the dewaxing solvent (the process usually known as "Benzol-Ketone Dewaxing"), the broader aspects of the process are as follows:

1. The introduction of a solvent regenerated adsorbent with a solvent solution of a petroleum stock as feed to the conventional stripping tower on the solvent treating unit. Stripping of the solvent from the adsorbent-oil mixture would occur in the stripper, while the stripper, particularly in the lower section, would serve as the contactor for oil and adsorbent.

2. The withdrawal of oil and adsorbent as a slurry therefrom from the bottom of the stripper, possibly into a holding tank, with or without additional heating, as dictated by the time and temperature necessities of the decolorizing operation.

3. The removal of the solids from the finished petroleum fraction.

4. Removal of entrained oil from the spent adsorbent.

5. Regeneration of the spent adsorbent by solvent regeneration using a solvent fraction derived at least in part from the original solvent stripper.

6. Return of adsorbent to contacting in the stripper.

7. Cleanup of solvent from step 5 and rejection of color bodies (oil) from the system.

Under certain conditions, as outlined hereinafter, one or more of the above functional steps, such as steps 3 and 4, may be combined.

A more complete understanding of the process may be had by reference to the drawings attached to and made a part of this specification.

In these drawings Figure 1 sets forth the process in a generalized and diagrammatic fashion, while;

Figure 2 shows the process as applied to conventional Benzol-Ketone Solvent Dewaxing.

Turning now to Figure 1, an incoming mixture of solvent treated oil and solvent from a previous solvent refining process is fed through pipe to solvent stripper 11. At pipe 12 there is brought in a slurry of regenerated adsorbent, which may be thinned for transport, if necessary, by any appropriate system fluid, as preferably by a portion of the oil-solvent mixture from pipe 10 which has been diverted through pipe 13. The solvent stripper 11 is heated, as by steam introduced at 14, and the solvent is removed overhead as a vapor through pipe 15, to be condensed in cooler 16, and collected in receiver 17. A mixture of oil and adsorbent is removed from the bottom of stripper 11 through pipe 18, and thereafter may be sent through auxiliary heater 19 and time tank 20 if this be necessary or, if the contacting in stripper 11 has been sufficient, the oil-adsorbent mixture may pass directly through pipe 21 to separator 22. Separator 22 is a diagrammatic showing of any form of separator for the adsorbent and oil, and may take the form of a settling tank, any gravity-differential multiplying separator such as a centrifuge, or hydraulic classification; a filter, a solvent separation, or a liquid displacement operation, which gives rise to separated decolorized oil removed from the system at pipe 23, and spent solid departing from the separator 22 at pipe 24. This spent adsorbent passes to oil washer 25, where the oil which is entrained or occluded or otherwise carried with the adsorbent (as distinguished from the color-bodies adsorbed therein or thereon), is removed by washing with a solvent, which conveniently is the condensed solvent from stripper overhead, lead in from receiver 17 through pipe 26. If desirable, a portion of this solvent may be used, through pipe 27 as a transport medium to assist in getting the solid into vessel 25. The oil removed from the adsorbent in 25 may be disposed of most conveniently by taking it through pipe 28 back to the stripper 11 as a recycle stream, though in many cases it will be of quality high enough for discharge from the system (after solvent recovery), as indicated at 29. Spent, oil-free adsorbent from washer 25 passes through pipe 30 to adsorbent regenerator 31, wherein color bodies are removed from it by solvent treatment with solvent from receiver 17, introduced by pipe 32. Again, solvent from 17 may be used as a solid adsorbent transport medium by introduction through pipe 33. Regenerated adsorbent, withdrawn as a slurry from regenerator 31 through pipe 34 is returned to contacting in stripper 11, using as a transporting medium, if necessary, oil-solvent mix from pipe 13, as previously explained. The contaminated solvent, containing color-bodies removed from the adsorbent, passes through pipe 34 to solvent recovery still 36, from which solvent passes overhead through pipe 37, and color-bodies (oil) and water may be withdrawn, as appropriate, dependent upon their relative boiling points, through pipes 38 and 39. Recovered solvent from pipe 37, as well as solvent from receiver 17, withdrawn through pipe 40, return to the solvent refining process with which this decolorizing process is associated.

In many cases, hot water will be an effective agent for the removal of the occluded or entrained oil from the adsorbent in oil washer 25, and may be introduced thereto either as steam or hot water by pipe 41, while excess water may be withdrawn by pipe 42. It is to be understood that this separation using steam or hot water is not a distillation operation. Throughout the above description of Figure 1, it is to be understood that the figure is highly diagrammatic and that the various portions thereof are not to be understood as depicting specific kinds of apparatus or vessels, but rather as depicting operative steps.

Turning to Figure 2, there is a showing of a preferred arrangement of the process as operated in connection with a conventional "Benzol-Ketone" dewaxing process in which the solvent used in dewaxing is a mixture of toluene and methyl ethyl ketone. In explaining this figure, the explanation will also serve as a showing of an exemplary operation conducted in accordance with the invention.

In Figure 2, a stream of mixed oil and solvent, comprising about 95% oil and 5% solvent, coming from a primary solvent stripper in the dewaxing operation, is introduced through pipe 43 into final solvent stripper 44, an existing, essential, part of the dewaxing operation. Through pipe 45 there is fed in a slurry of adsorbent, spoken of now as bead fines (and defined later herein). The proportion of bead fines so introduced will in general be from about 1 to about 25% by weight based upon the dewaxed oil entering through pipe 43. The temperature in the stripping still 44, heated in the usual manner, with steam introduced at 46, will be held in the range 300–600° F., usually at about 450° F. for the purpose of removing solvent in the conventional manner. The stripping still not only functions in its usual manner, for removing solvent, but also, for its time and temperature characteristics are appropriate, as a contactor for decolorizing the oil through the agency of the bead fines. Solvent, constituting a mixture of toluene, MEK (methyl-ethyl ketone), and water, passes overhead through pipe 47, through a condensing system diagrammatically indicated at 48, and into the existing solvent decanter 49, being joined therein by a solvent mixture, similar except for proportions, derived at other points in the existing dewaxing system and introduced through pipe 50. At the bottom of stripping still 44, through pipe 51, there is withdrawn the dewaxed oil, now also decolorized, containing the bead fines adsorbent, which now hold the color bodies. This oil is cooled by passage through cooler 52 and introduced into separator 53. Separator 53 contains a body of water, held at about 150–200° F. When contacted with this water, the oil and the bead fines separate one from another, and the separation under these conditions is quite effective, so that the bead fines are substantially free of oil, containing only color bodies, thus combining the operations indicated in vessels 22 and 25 of Figure 1 and specified as steps 3 and 4 in the general description of the process. The separated oil rises to the top of the separator, to be removed through pipe 54, and passed through blotter press 55, if necessary, for final removal of any remaining fines, the return of which fines to separator 53 is indicated by line 56. Dewaxed, decolorized oil is removed from the system at 57. Water for this operation may be introduced through pipe 58 into separator 53, or may be premixed with the feed to separator 53 by introduction through pipe 59 into pipe 51. Bead fines, substantially oil-free, but containing adsorbed color bodies, drop to and collect in the bottom of separator 53, to be removed therefrom as a slurry through pipe 60. Contaminated bead fines adsorbent, passing from separator 53 through pipe 60, go into regenerator 61. In regenerator 61 there is maintained a body of MEK-water mixture, containing at least about 40% of MEK, and maintained at a temperature of about 140–165° F. This solvent substantially removes the color bodies from the bead fines, and these color-bodies, an oil in physical nature, rise through and collect above the solvent body in the regenerator 61. The regenerated bead fines drop to the bottom of the regenerator 61, collect there, and are moved as a slurry through pipe 45 to reuse. The collected color-body oil phase, consisting of color-body oil, MEK, and some water, is withdrawn at the top of regenerator 61 through pipe 62 and passes to the existing CBM tower 63 of the dewaxing system, together with water phase from decanter 49 of the existing system brought in by pipe 64. Turning for the moment to items 49 and 63 which are part of the existing dewaxing system, decanter 49 is used to separate condensate from solvent recovery operations into a solvent phase, returned to the system through pipe 65, and a water phase, containing MEK, which is sent to the CBM still 63. In the "CBM" still, this ketone is recovered by distilling overhead a constant boiling mixture (CBM) of 90% MEK and 10% water, passing through pipe 66 and condenser 67 for return to the decanter 49. In the present arrangement, the CBM still 63 has the added duty of separating the constant boiling mixture from the color-body oil, which is quite within its capabilities. Water and color-body oil are withdrawn through pipe 68 from the bottom of CBM still 63 and pass to decanter 69. Here, color-body oil is separated, to be withdrawn from the system by pipe 70, and water is withdrawn from the system by pipe 71. The proper balance of MEK and water is maintained in regenerator 61 by drawing water from 71 through pipe 72, and MEK-rich CBM from pipe 66 through pipe 73, to be mixed and introduced to regenerator 61 through pipe 74, while depleted regenerator solvent is withdrawn at 75. If desired, all or part of the regenerating solvent may be premixed with the spent adsorbent in pipe 60, as indicated diagrammatically by pipe 76. The solvent so used in pipe 76 may be circulated from separator 61 or derived from pipe 74. Connections appropriate for this are omitted for purposes of simplification. Depleted regenerator solvent withdrawn at 75 is conveniently passed to CBM still 63 through connections omitted for simplicity, although it may be discarded. Throughout this figure, pumps, reflux feeds, auxiliary conventionally installed heaters, and the like have been omitted for purposes of simplification, and their presence is understood and assumed.

While this process is generally capable, as pointed out previously, of being combined with any solvent refining process for treating oils, it will of course be understood that the interplay of two factors determines the suitability of the combination. The principal factor is of course the capability of the solvent or solvents being used to act as regenerative agents for the adsorbent. In particular, those solvents of a polar nature are preferred, such as the ketones, including methyl-ethyl ketone (MEK), acetone, and the like; alcohols, esters, phenols, and the like. The principal criteria of usefulness, in addition to this capability, are that the solvent be liquid at temperatures of the order of atmospheric to about 300° F. or be capable of being maintained as a liquid at those temperatures without the use of uneconomical high pressures; that the solvent be capable of dissolving reasonable amounts of oil and possessing at least a minor amount of solubility in water; and that the solvent be one readily separable from oils, color-body oils and the like by the usual physical processes of separation such as distillation, etc. Looking at both the usual lube oil solvent refining processes, and the requirements for the processes here discussed, the preferred solvents will be, for most commercial cases presently contemplated, the ketones.

The second factor is the solid adsorbent. It obviously must be possessed of decolorizing ability. It must also be possessed of a capability of being well regenerated by the solvents available in the associated process. Moreover, it must be one which does not deteriorate to a mud or slop or be dissolved in water, for in any of these processes, appreciable water is present from various sources, and, in the preferred form, a water separation step, as explained before, is made use of. Among adsorbents useful to at least some extent in this process are "Beadfines," the commercial products known as "Magnesol," a commercial magnesium silicate, "Super Filtrol," a montmorillonite, other montmorillonites, bauxite, silica gel, Attapulgites, activated charcoal, and the like. Of these, the preferred material is "Beadfines." Bead fines are the fine material produced as a by-product during the manufacture of silica-alumina bead cracking catalysts, or produced by grinding the bead product. Typical details of the silica-alumina bead catalyst, and of its method of manufacture are shown in U. S. Patent 2,384,946, issued September 18, 1945, to Milton M. Marisic. In bead form, these beads are not appropriate for processes such as this, nor in particles of intermediate size, since they exhibit absorptive habits and do not act quite parallel to usual decolorizing adsorbents. However in particle form, in very small sizes, they decolorize in a manner more or less parallel to usual adsorbents. Bead fines, to be effective in this process, should be pulverized to a grain size which will pass through a 100 mesh Tyler screen and preferably within the range of about 150–400 mesh size. A particularly effective adsorbent bead fines material is one which has less than 10% retained on 140 mesh Tyler, and passes 50–60% through 300 mesh.

This bead fines material, from the standpoint of decolorizing ability alone, is a good, although not an outstanding material, as shown by the following tabulation, wherein a stock of 90 Lovibond color and of 122 S. U. V. at 210° F. was treated with several adsorbents:

Table I

| Adsorbent | Bead Fines | | | Mag-nesol | Super-Filtrol | Baux-ite |
| --- | --- | --- | --- | --- | --- | --- |
| | #1 | #2 | #3 | | | |
| Percent wt. adsorbent | 10 | 10 | 10 | 10 | 10 | 10 |
| Temperature, °F | 400 | 400 | 400 | 400 | 400 | 400 |
| Filtered oil, Color-Lov | 44 | 44 | 49 | 28 | 20 | 68 |

Note.—Three samples of bead fines, differing slightly in detailed manufacture, were used.

The outstanding advantage of bead fines shows up in the ease with which the spent adsorbent may be separated from the oil in the separation step. The following tabulation shows a set of experiments conducted as follows. The oil was treated with the adsorbent, as shown in Table I, above, and the oil and spent adsorbent, containing color-bodies, was then admixed with 50% by weight of distilled water and the mixture was injected into a column of water, at the indicated temperature. After settling, there were formed three layers, i. e., supernatant oil, water, and settled adsorbent. The supernatant oil phase was examined for degree of freedom from water and adsorbent.

Table II

| Adsorbent | Bead Fines #3 | Mag-nesol | Super-filtrol | Bauxite, etc. |
| --- | --- | --- | --- | --- |
| Temperature, °F | 163/183 | 170/190 | 180/185 | 170/190 |
| Percent (wt.) oil phase | 14.8 | 24.7 | 23.3 | 22.4 |
| Percent (wt.) water phase | 81.0 | 72.2 | 74.4 | 73.7 |
| Percent (wt.) settled phase | 4.2 | 3.1 | 2.3 | 3.9 |
| Composition Oil Phase: | | | | |
| Percent (wt.) oil | 99.77 | 58.8 | 73.1 | 72.0 |
| Percent (wt.) water | Trace | 32.9 | 23.0 | 22.8 |
| Percent (wt.) adsorbent | 0.23 | 8.3 | 3.9 | 5.2 |

The significant figure in the above table is found in the last row, horizontally. Bead fines provide to be capable of substantially complete separation from entrained oil, and, due to such capability, the oil was also substantially free of water. The other adsorbents were held up in the oil to a substantial degree, and, because of such hold-up, the oil phase was found to contain considerable water. The economies of processing resulting from this feature are obvious.

Returning to features of processing, the conditions for the operation of the contacting step have already been discussed hereinbefore. The water separation step, wherein the oil, containing adsorbent, coming from the contacting step is freed of adsorbent, should be about as follows: the temperature is the most important variable, and should be held high, to cut down the viscosity of the oil and permit better separation. A practical minimum temperature for this separation step is at least 150° F. in the case of undiluted oils, such as those derived from the final stripping still of a lube oil solvent refining process. Increased ease of separation is gotten with higher temperatures, and the temperature can be raised, with appropriate imposition of pressure to maintain liquid water, up to temperatures of the order of the 300°–600° F. which exist in the contacting step. Usually, economies of pressure handling versus ease of settling will determine an appropriate upper limit for a specific operation. In general, temperatures of the order of 200–250° F., with slight pressure retention if necessary, will be found desirable. The time of settling will be found to vary widely with the nature of the adsorbent used. With bead fines, the separation is quick and sharp and a small time factor is used. With other adsorbents, longer time factors are necessary and must be established by experimentation.

While the process herein disclosed is appropriate for combination with several solvent refining processes, and in any such circumstance may make use of an adsorbent selected from a rather broad group, it is obvious from the above that in its preferred form it is best coupled with a solvent dewaxing operation making use of ketone-type solvents, and that in any combination it is best when practised with bead fines originating from the co-gelation of silica and alumina as set forth in various patents to Marisic, such as U. S. Patent 2,384,946, wherein the co-gelation method of bead preparation and the subsequent steps of treatment are set forth. It will be understood that in many cases, the bead fines material may contain significant amounts of other materials, as for example oxides of metals other than silica and alumina, added for other purposes, without significant effect upon their usefulness for this process.

I claim:

1. That method for the decolorization of oils which comprises: admixing a finely pulverulent solid adsorbent having a grain size which will pass through a 100 mesh Tyler screen originally produced by the co-gelation of silica and alumina with a liquid mixture of oil and a solvent capable of removing adsorbed color bodies from the adsorbent when said adsorbent is spent, passing the mixture of oil, solid and solvent into a stripping tower wherein solvent is removed as vapor while the adsorbent removes color bodies from the oil, removing the oil together with contaminated adsorbent from the said stripper, treating the mixture of oil and contaminated adsorbent with hot water and settling the same, thereby obtaining an oil phase of improved color substantially free of water and substantially free of entrained adsorbent; passing the spent adsorbent from the separating step to a regenerating step, regenerating the spent adsorbent by dissolving color bodies from it with solvent derived at least in part from the condensed stripper overhead, returning the regenerated adsorbent to the original admixture step, freeing the regenerating solvent from color body oil and returning the said solvent to the system while discarding the color body oil.

2. The method as defined in claim 1 wherein the said solvent is a ketone solvent.

References Cited in the file of this patent
UNITED STATES PATENTS

| | | |
|---|---|---|
| 1,905,087 | Goebel | Apr. 23, 1933 |
| 2,236,679 | Ferguson et al. | Apr. 11, 1941 |
| 2,321,460 | Chenault et al. | June 8, 1943 |
| 2,326,295 | Gee | Aug. 10, 1943 |
| 2,453,933 | Palizzotto et al. | Nov. 16, 1948 |
| 2,571,380 | Penick | Oct. 16, 1951 |
| 2,602,044 | Lupfer et al. | July 1, 1952 |
| 2,666,732 | McConnell | Jan. 19, 1954 |